United States Patent
Adams

(10) Patent No.: US 8,993,884 B1
(45) Date of Patent: Mar. 31, 2015

(54) WIRE THEFT DETERRENT SYSTEM

(71) Applicant: Dan R. Adams, Bellingham, WA (US)

(72) Inventor: Dan R. Adams, Bellingham, WA (US)

(73) Assignee: Mt. Baker Cable, LLC, Everson, WA (US)

( * ) Notice: Subject to any disclaimer, the term of this patent is extended or adjusted under 35 U.S.C. 154(b) by 69 days.

(21) Appl. No.: 13/905,104

(22) Filed: May 29, 2013

Related U.S. Application Data

(60) Provisional application No. 61/652,778, filed on May 29, 2012.

(51) Int. Cl.
*H02G 7/20* (2006.01)
*H02G 3/04* (2006.01)
*H01B 7/20* (2006.01)

(52) U.S. Cl.
CPC ..................................... *H01B 7/207* (2013.01)
USPC ........ 174/40 R; 174/45 R; 174/136; 138/156; 138/159

(58) Field of Classification Search
USPC ............ 174/40 R, 45 R, 481, 493, 68.1, 68.3, 174/70 R, 89, 84 S, 70 C, 60, 135, 136; 138/156, 158, 159, 163, 167, 101, 100, 138/106; 248/71, 219.3
See application file for complete search history.

(56) References Cited

U.S. PATENT DOCUMENTS

| | | | | |
|---|---|---|---|---|
| 304,787 | A | * | 9/1884 | Butz .............................. 138/159 |
| 3,740,455 | A | * | 6/1973 | Willox .......................... 174/101 |
| 5,804,769 | A | * | 9/1998 | Morena ......................... 174/136 |
| 2013/0011215 | A1 | * | 1/2013 | Wells et al. ................... 411/402 |

* cited by examiner

*Primary Examiner* — Hoa C Nguyen
*Assistant Examiner* — Amol Patel
(74) *Attorney, Agent, or Firm* — Michael R. Schacht; Schacht Law Office, Inc.

(57) ABSTRACT

A wire theft deterrent system includes a first U-shaped portion and a second U-shaped portion for encapsulating wire in a riser that is associated with a telephone pole. The first and second U-shaped portions are both made of stainless steel, so as to be substantially resistant to saw blades and hammers. The first U-shaped portion and the second U-shaped portion are connected to one another by high-security fasteners, each of which passes through an aperture in a flange of the first U-shaped portion and a corresponding aperture in a flange of the second U-shaped portion. The high-security fasteners restrict access to the encapsulated wires, so as to deter wire theft.

12 Claims, 3 Drawing Sheets

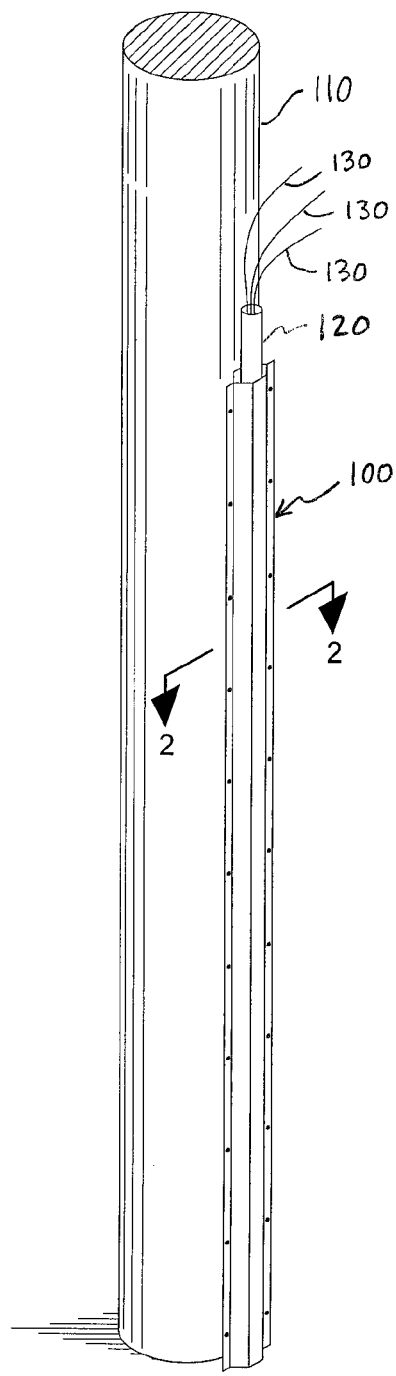
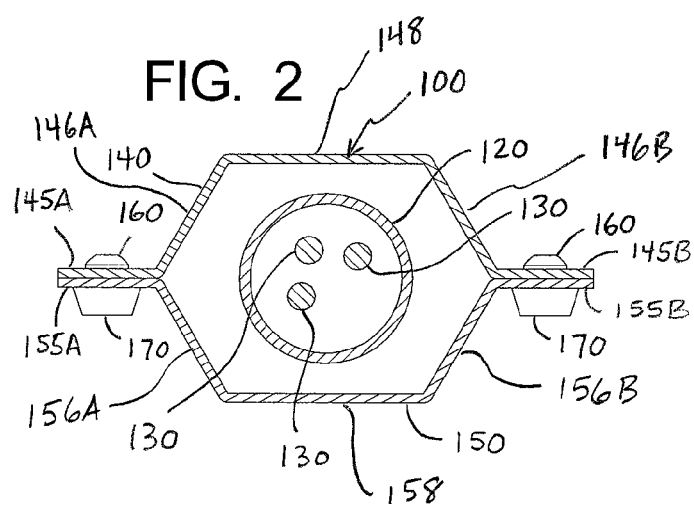
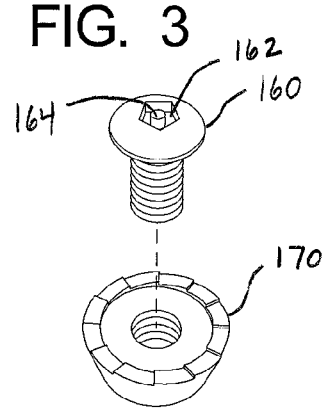
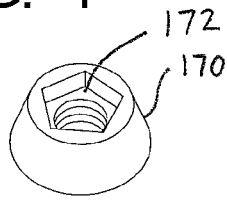

WIRE THEFT DETERRENT SYSTEM

CROSS-REFERENCE TO RELATED APPLICATION

This application claims the benefit of U.S. Provisional Application No. 61/652,778 filed May 29, 2012. The aforementioned application is incorporated herein by reference in its entirety.

FIELD OF THE INVENTION

The present invention relates generally to theft deterrent systems. More particularly, the present invention relates to wire theft deterrent systems.

BACKGROUND OF THE INVENTION

Prices of metals have risen sharply over the last decade. For example, the price of copper on the Comex division of the New York Mercantile Exchange increased from less than $1 per pound in 2001 to about $4 per pound in early 2012. Accordingly, copper has become very valuable.

As is well known, copper is used in connection with telephone, power, and cable TV wiring. Due to its valuable nature, thieves have been stealing copper wires from telephone, power, and cable TV systems. While the cost of the copper wire is expensive, the repair costs are much higher. According to some estimates, for each dollar of copper wire that is stolen, the repair costs amount from $10 to $25. The repair costs do not factor in the downtime to consumers, who experience interruptions to their telephone, cable, power and internet service.

Some thieves mistake copper telephone wire with fiber optic cabling. In such case, repair costs are borne by cable, power, or telephone companies. When fiber optic cabling is stolen or damaged, consumers' television, telephone, power, and internet service is interrupted, which results in inefficiencies and causes consumers to view these companies in an unfavorable manner.

The aforementioned telephone, cable, and power system repairs are ultimately passed on to consumers. Accordingly, it would be beneficial for consumers, along with telephone, cable, and power companies, if a mechanism was developed to deter thieves from stealing or attempting to steal copper wire.

SUMMARY OF THE INVENTION

The present invention is designed to address at least one of the aforementioned problems and/or meet at least one of the aforementioned needs.

A wire theft deterrent system includes a first U-shaped portion and a second U-shaped portion for encapsulating wire in a riser that is associated with a telephone pole. The first and second U-shaped portions are both made of stainless steel, so as to be substantially resistant to saw blades and hammers. The first U-shaped portion and the second U-shaped portion are connected to one another by high-security fasteners, each of which passes through an aperture in a flange of the first U-shaped portion and a corresponding aperture in a flange of the second U-shaped portion. The high-security fasteners restrict access to the encapsulated wires, so as to deter wire theft.

In one embodiment, the first U-shaped portion has a first flange, a first side wall, an end wall, a second side wall and a second flange. The first and second flanges of the first U-shaped portion each have apertures therein, and the end wall of the first U-shaped portion is parallel to the first flange. The first flange and the first side wall form an exterior angle greater than 90 degrees and less than 150 degrees. Likewise, the second flange and the second side wall form an exterior angle greater than 90 degrees and less than 150 degrees;

Similarly, the second U-shaped portion has a first flange, a first side wall, an end wall, a second side wall and a second flange. The first and second flanges of the second U-shaped portion each have apertures therein, and the end wall of the second U-shaped portion is parallel to the first flange. The first flange and the first side wall form an exterior angle greater than 90 degrees and less than 150 degrees, wherein the second flange and the second side wall form an exterior angle greater than 90 degrees and less than 150 degrees.

The first U-shaped portion and the second U-shaped portion are connected to one another by a first set of high-security fasteners and a second set of high-security fasteners. Each of the first set of high-security fasteners passes through an aperture in the first flange of the first U-shaped portion and a corresponding aperture in first flange of the second U-shaped portion. Likewise, each of the second set of high-security fasteners passes through an aperture in the second flange of the second U-shaped portion and a corresponding aperture in the second flange of the second U-shaped portion.

In one embodiment, the end wall of the first U-shaped portion and the end wall of the second U-shaped portion are parallel to each other. Furthermore, in one embodiment, the first side wall of the first U-shaped portion is parallel to the second side wall of the second U-shaped portion. Even further, in one embodiment, the second side wall of the first U-shaped portion is parallel to the first side wall of the second U-shaped portion.

In one embodiment, the high-security fastener includes a screw and a nut. More specifically, the screw has a pentagonal recess and a pintle that is centered within the pentagonal recess. In addition, the nut has a pentagonal recess.

In one embodiment, a channel nut unit is used to attach and detach the wire theft deterrent system to a pole standoff system that spaces a riser away from a telephone pole. The channel nut unit includes a channel nut and a channel bolt. Rotation of the channel bolt causes rotation of the channel nut, such that the channel nut can be attached to and detached from the pole standoff system, which has a channel therein. The channel bolt is encapsulated by the first U-shaped portion and the second U-shaped portion when in a deterrent configuration. The wire theft deterrent system may only be attached to and detached from the pole standoff system when the channel nut is accessible.

Other objects, features, embodiments and advantages of the invention will be apparent from the following specification taken in conjunction with the following drawings.

BRIEF DESCRIPTION OF THE DRAWINGS

FIG. 1 is a perspective view of one exemplary embodiment of a wire theft deterrent system of the present invention that is used in conjunction with a utility pole and a riser having copper wire therein;

FIG. 2 is a cross-sectional view of the wire theft deterrent system taken along line 2-2 of FIG. 1, wherein a riser is located within the wire theft deterrent system and copper wire is located within the riser;

FIG. 3 is a top perspective view of a high-security fastener that may be used in conjunction with the wire theft deterrent system of FIG. 1, showing a screw and a nut;

FIG. 4 is a bottom perspective view of the nut of FIG. 3;

DETAILED DESCRIPTION

Figure 5:
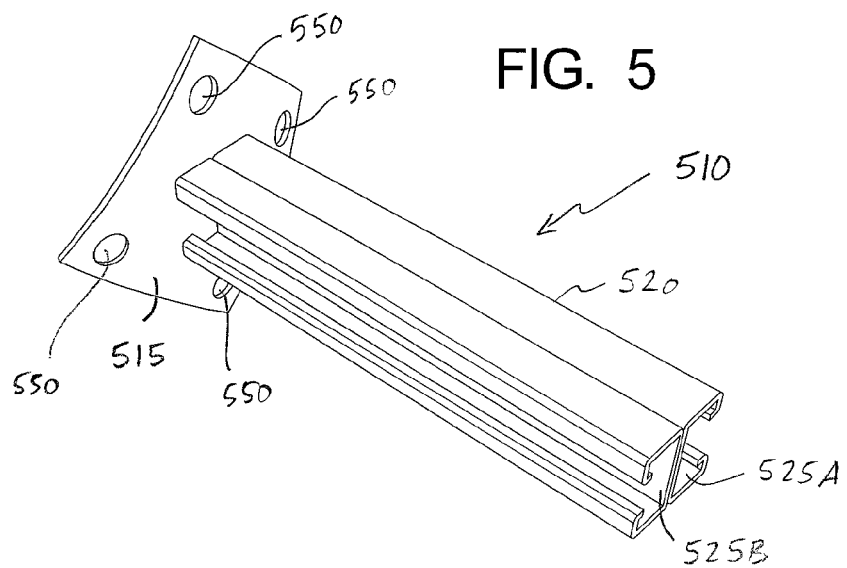
FIG. 5 is a perspective view of a portion of a pole standoff system.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

An exemplary embodiment of a wire theft deterrent system 100 is illustrated in FIG. 1. The wire theft deterrent system 100 of the present invention is used in conjunction with a utility pole 110 and a riser 120 that runs vertically along at least a portion of the utility pole 110. The riser 120 has wires 130 therein. The riser 120 may be made of metal or plastic and is used to bundle and protect the wires 130.

In the absence of the wire theft deterrent system 100 of the present invention, thieves gain access to cable, power and telephone wire 130, which is made of copper, by cutting through (e.g., with a hacksaw) or breaking through (e.g., with a hammer or similar device) the riser 120. Then, thieves pull the cable, power, or telephone wire 130 through the location in the riser 120 from which they have gained access. The cable, power, or telephone wire 130 is cut and then taken away, so that it can be sold.

The inventor of the present invention recognizes that it is very difficult to cut through stainless steel. Thus, if thieves were to try to use a hacksaw in an attempt to quickly cut through stainless steel, the hacksaw's blades would have no real affect. Accordingly, the inventor has designed a wire theft deterrent system 100 made of stainless steel that can be retrofitted to existing utility poles 110 that use risers 120.

FIG. 2 is a cross-sectional view of the wire theft deterrent system 100 taken along line 2-2 of FIG. 1. In FIG. 2, the riser 120 is located within the wire theft deterrent system 100 and cable, power, or telephone wire 130 is located within the riser 120.

The wire theft deterrent system 100 includes a first generally U-shaped portion 140 and a second generally U-shaped portion 150. The first generally U-shaped portion 140 and the second generally U-shaped portion 150 are made of stainless steel.

Still referring to FIG. 2, the first generally U-shaped portion 140 has first and second integral flanges 145A, 145B, which correspond with first and second integral flanges 155A, 155B of second generally U-shaped portion 150. Flanges 145A, 155A have one or more apertures (not shown) that are aligned with one another, so as to receive one or more fasteners (see also, FIG. 1). Similarly, flanges 145B, 155B have one or more apertures (not shown) that are aligned with one another, so as to receive one or more fasteners (see also, FIG. 1). In one embodiment, the fastener is a high-security fastener having a screw 160 and a nut 170 (see, e.g., FIGS. 3 and 4).

In addition to the first and second flanges 145A, 145B, the first U-shaped portion 140 includes first and second side walls 146A, 146B, along with an end wall 148. The first flange 145A and the first side wall 146A are disposed at an (exterior) angle of greater than 90 degrees relative to one another. In one embodiment, the angle is greater than 90 degrees, but less than or equal to 135 degrees. In one embodiment, the angle is greater than 90 degrees but less than 150 degrees.

In one embodiment, the end wall 148 and the first flange 145A are parallel to one another. In one embodiment, the end wall 148 is parallel to both the first flange 145A and second flange 145B.

Similarly, in addition to first and second flanges 155A, 155B, the second U-shaped portion 150 includes first and second side walls 156A, 156B, along with an end wall 158. The first flange 155A and the first side wall 156A are disposed at an (exterior) angle of greater than 90 degrees relative to one another. In one embodiment, the angle is greater than 90 degrees, but less than or equal to 135 degrees. In one embodiment, the angle is greater than 90 degrees but less than 150 degrees.

In one embodiment, the end wall 158 and the first flange 155A are parallel to one another. In one embodiment, the end wall 158 is parallel to both the first flange 155A and second flange 155B.

In one embodiment, first U-shaped portion 140 and second U-shaped portion 150 are substantially identical in shape. In one embodiment, opposing side walls (e.g. first side wall 146A and second side wall 156B; second side wall 146B and first side wall 156A) are parallel to one another. In one embodiment, end wall 148 is parallel to end wall 158.

FIG. 3 is a top perspective view of a high-security fastener that may be used in conjunction with wire theft deterrent system 100 of FIGS. 1 and 2, showing a screw 160 and a nut 170. FIG. 4 is a bottom perspective view of the nut 170 of FIG. 3. The high security fastener of FIG. 3 is available from Bryce Fastener (www.brycefastener.com) of Gilbert, Ariz. and is sold under the Penta-Plus trade name. It should be understood that other high security fasteners may also be used in conjunction with the present invention.

With reference to FIG. 3, the screw 160 has a recess 162 with a pentagonal shape. Furthermore, the screw 160 also includes a pintle 164 within the recess 162. Due to the shape of the recess 162 and the presence of the pintle 164, removal of the screw 160 is difficult without the use of a specially-shaped tool.

With reference to FIG. 4, the bottom of the nut 170 also has a recess 172 with a pentagonal shape. When the screw 160 and the nut 170 are attached to one another, the screw 160 may protrude through the recess 172 and, accordingly, act like pintle 164. In this configuration, removal of the nut 170 becomes difficult without use of a specially-shaped tool.

Returning now to FIG. 2, the wire theft deterrent system 100 is designed to fit around the riser 120, which contains cable, power, or telephone wires 130. During installation, the first generally U-shaped portion 140 is placed around the riser 120. Then, the second generally U-shaped portion 150 is placed around the riser 120. Fasteners are used to secure the first generally U-shaped portion 140 to the second generally U-shaped portion 150. Using a removable, but highly-secure fastener, like the Penta-Plus fastener 160, 170 may be advantageous (at least, in some situations) because it permits authorized personnel to access the riser 120 or cable, power, or telephone wires 130 when necessary, while still deterring thieves from accessing the wires 130.

In some situations, a more permanent connection between the first generally U-shaped portion 140 and the second generally U-shaped portion 140 may be warranted. In such cases, pop-rivets (e.g., also made of stainless steel) or similar devices may be used to make the connection.

In one embodiment, the first and second generally U-shaped portions 140, 150 may be connected to one another on one end by a hinge.

Certain jurisdictions require the riser 120 (in which the wires 130 reside) to be spaced apart from the utility pole 110. In such case, a pole standoff system may be used.

Figure 6:
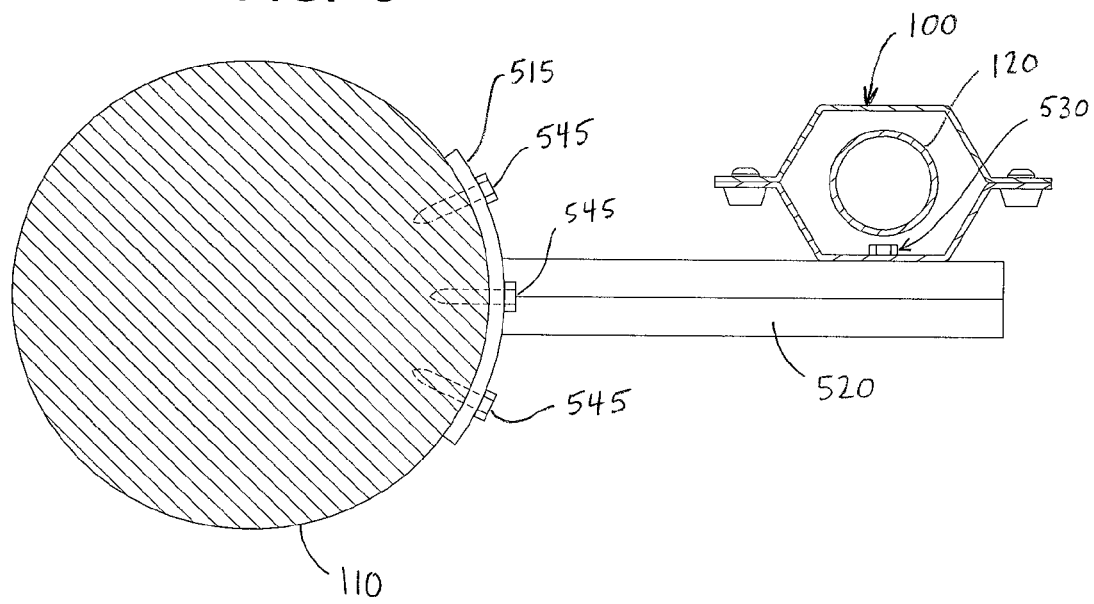
FIG. 6 is a partial cross-sectional top view showing a utility pole having a pole standoff system attached thereto, so as to space the wire theft deterrent system (and, hence, the riser) from the utility pole; and, FIG. 7 is a partial cross-sectional plan view showing how the wire theft deterrent system and the pole standoff system are attached to one another.

FIG. 5 is a perspective view of a portion of a pole standoff system 510, while FIG. 6 is a partial cross-sectional top view showing a utility pole 110 having a pole standoff system 510 attached thereto, so as to space the wire theft deterrent system 100 (and, hence, the riser 120) from the utility pole 110. In addition, FIG. 7 is a partial cross-sectional plan view showing how the wire theft deterrent system 100 and the pole standoff system 510 are attached to one another.

Figure 7:
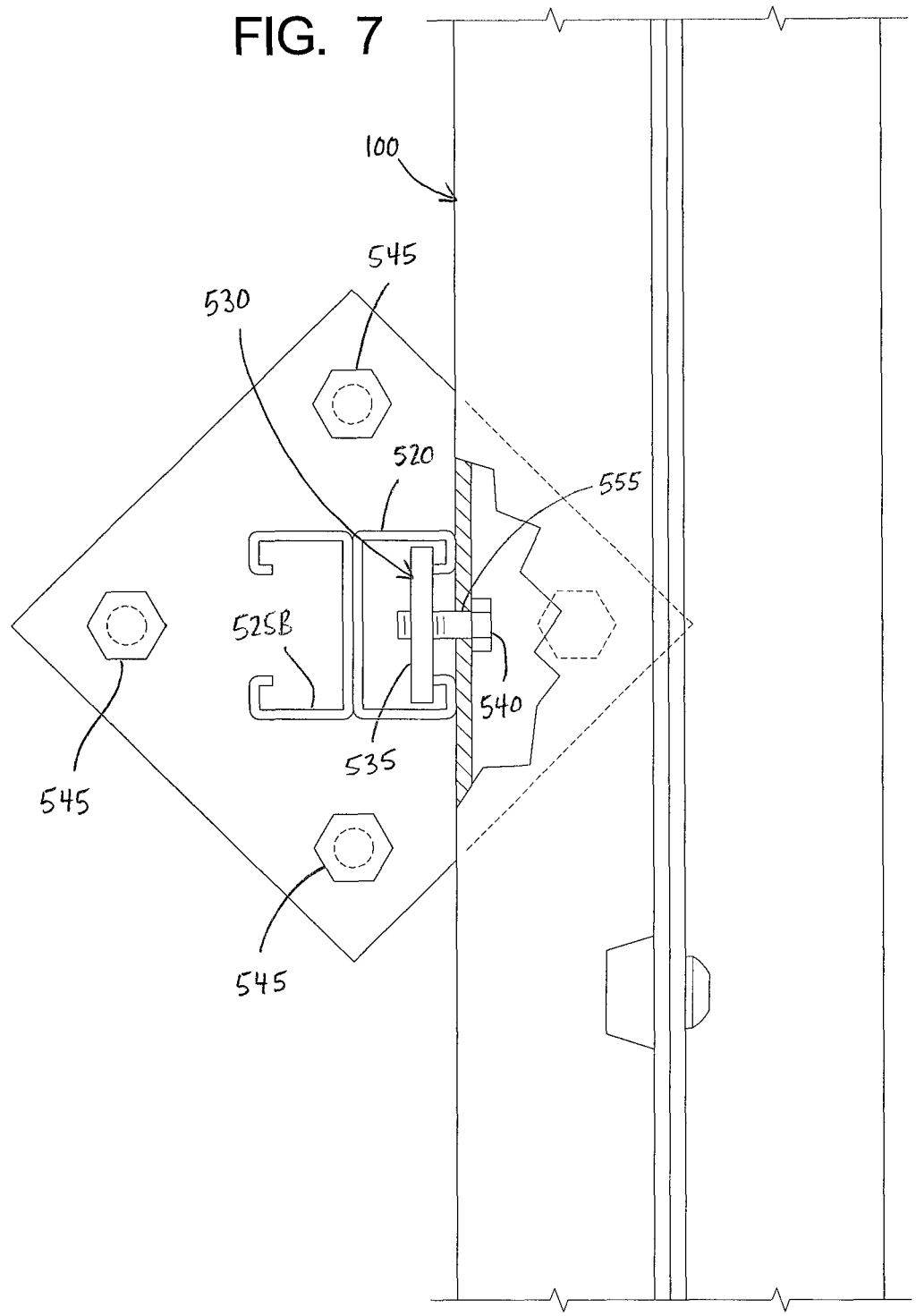

With reference to FIGS. 5-7, the pole standoff system 510 includes an attachment plate 515, metal framing 520 configured with first and second channels 525A, 525B, a channel nut unit 530 having a channel nut 535 and a channel bolt 540, and lugs 545. As shown in FIGS. 5 and 6, the attachment plate 515 includes a plurality of apertures 550 which receive lugs 545, so as to attach the pole standoff system 510 to the utility pole 110.

In one embodiment, the attachment plate 515 and the metal framing 520 are integral with one another. In one embodiment, the attachment plate 515 and the metal framing 520 are fixedly attached to one another.

Referring again to FIGS. 5-7, the wire theft deterrent system 100 is attached to the pole standoff system 510 using a channel nut unit 530 located within one of the channels 525A. More specifically, as shown in FIG. 7, the wire theft deterrent system 100 includes a hole 555 through which the channel bolt 540 passes.

The channel nut 535 is placed within channel 525A and its opening is aligned with hole 555. The channel nut 535 is held in place in the channel 525A via a spring (not shown) that bears against the vertical flat surface of the channel 525, so as to bias the channel nut 535 towards the channel bolt 540 and against the turned-in edges of the metal framing 520. The channel nut 535 can include recessed areas (not shown) therein, so as to receive the turned-in edges of the metal framing 520.

The head of the channel bolt 540 serves to retain the channel bolt 540 within the wire theft deterrent system 100. The channel bolt 540 is threaded into the opening of the channel nut 535 by rotating head of the channel bolt 540, so as to create a connection between the wire theft deterrent system 100 and the pole standoff system 510.

Because the head of the channel bolt 540 is located within the wire theft deterrent system 100, access thereto may be restricted by screw 160 and nut 170 of the high-security fastener. Accordingly, the wire theft deterrent system 100 and the pole standoff system 510 may not be connected to, or disconnected from, one another unless an individual is able to access the interior of the wire theft deterrent system 100.

Metal framing 520, channel nuts 535 and channel bolts 540 similar to those shown in the figures and described herein are available from Atkore International of Harvey, Ill. and are sold under the Unistrut® brand name (see www.unistrut.us for certain details).

Although two channels 525A, 525B are shown in FIG. 5, it should be understood that the metal framing 520 is not required to have two channels. Instead, a single channel may be provided.

It should be noted that more than one pole standoff system 510 may be connected to the utility pole 110 and to the wire theft deterrent system 100.

In one embodiment, only the first U-shaped portion 140 is used to protect wires, rather than requiring both the first and second U-shaped portions 140, 150. This embodiment may be particularly useful when traversing bridges, such that the combination of the first U-shaped portion 140 and the bridge encapsulate the wires.

In one embodiment, the wire theft deterrent system 100 is shaped to receive multiple risers or the like.

Several embodiments of the invention have been described. It should be understood that the concepts described in connection with one embodiment of the invention may be combined with the concepts described in connection with another embodiment (or other embodiments) of the invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A wire theft deterrent system comprising:
a first U-shaped portion and a second U-shaped portion for encapsulating wire in a riser that is associated with a telephone pole, wherein the first and second U-shaped portions are both made of stainless steel, so as to be resistant to saws;
the first U-shaped portion having a first flange, a first side wall, an end wall, a second side wall and a second flange, wherein the first and second flanges each have apertures therein, wherein the end wall is parallel to the first flange, wherein the first flange and the first side wall form an exterior angle greater than 90 degrees and less than 150 degrees, wherein the second flange and the second side wall form an exterior angle greater than 90 degrees and less than 150 degrees;
the second U-shaped portion having a first flange, a first side wall, an end wall, a second side wall and a second flange, wherein the first and second flanges each have apertures therein, wherein the end wall is parallel to the first flange, wherein the first flange and the first side wall form an exterior angle greater than 90 degrees and less than 150 degrees, wherein the second flange and the second side wall form an exterior angle greater than 90 degrees and less than 150 degrees;
the first U-shaped portion and the second U-shaped portion being connected to one another by a first set of high-security fasteners, each of which passes through an aperture in the first flange of the first U-shaped portion and a corresponding aperture in first flange of the second U-shaped portion, and a second set of high-security fasteners, each of which passes through an aperture in the second flange of the second U-shaped portion and a corresponding aperture in the second flange of the second U-shaped portion; and
a channel nut unit which is used to attach and detach the wire theft deterrent system to a pole standoff system that spaces the riser away from the telephone pole, the channel nut unit including a channel nut and a channel bolt, wherein rotation of the channel bolt causes rotation of the channel nut, such that the channel nut can be attached to and detached from the pole standoff system, which has a channel therein, and wherein the channel bolt is encapsulated by the first U-shaped portion and the second U-shaped portion when in a deterrent configuration, and wherein the wire theft deterrent system may only be attached to and detached from the pole standoff system when the channel nut is accessible.

2. The wire theft deterrent system of claim 1, wherein the end wall of the first U-shaped portion and the end wall of the second U-shaped portion are parallel to each other, wherein the first side wall of the first U-shaped portion is parallel to the second side wall of the second U-shaped portion, and wherein the second side wall of the first U-shaped portion is parallel to the first side wall of the second U-shaped portion.

3. The wire theft deterrent system of claim 2, wherein the high-security fastener includes a screw and a nut, wherein the screw has a pentagonal recess and a pintle that is centered within the pentagonal recess, and wherein the nut has a pentagonal recess.

4. The wire theft deterrent system of claim 1, wherein the high-security fastener includes a screw and a nut, wherein the screw has a pentagonal recess and a pintle that is centered within the pentagonal recess, and wherein the nut has a pentagonal recess.

5. The wire theft deterrent system of claim 4, wherein the high-security fastener is made of stainless steel.

6. The wire theft deterrent system of claim 1, wherein the first and second U-shaped portions are substantially parallel to the telephone pole.

7. A wire theft deterrent system comprising:
a first U-shaped portion and a second U-shaped portion for encapsulating cable, power and telephone wire located in public areas, wherein the first and second U-shaped portions are both made of stainless steel, so as to be resistant to saws;
the first U-shaped portion having a first flange, a first side wall, an end wall, a second side wall and a second flange, wherein the first and second flanges each have apertures therein, wherein the end wall is parallel to the first flange, wherein the first flange and the first side wall form an exterior angle greater than 90 degrees and less than 150 degrees, wherein the second flange and the second side wall form an exterior angle greater than 90 degrees and less than 150 degrees;
the second U-shaped portion having a first flange, a first side wall, an end wall, a second side wall and a second flange, wherein the first and second flanges each have apertures therein, wherein the end wall is parallel to the first flange, wherein the first flange and the first side wall form an exterior angle greater than 90 degrees and less than 150 degrees, wherein the second flange and the second side wall form an exterior angle greater than 90 degrees and less than 150 degrees;
means for connecting the first U-shaped portion and the second U-shaped portion to one another; and
a channel nut unit which is used to attach and detach the wire theft deterrent system to a pole standoff system that spaces the riser away from the telephone pole, the channel nut unit including a channel nut and a channel bolt, wherein rotation of the channel bolt causes rotation of the channel nut, such that the channel nut can be attached to and detached from the pole standoff system, which has a channel therein, and wherein the channel bolt is encapsulated by the first U-shaped portion and the second U-shaped portion when in a deterrent configuration, and wherein the wire theft deterrent system may only be attached to and detached from the pole standoff system when the channel nut is accessible.

8. The wire theft deterrent system of claim 7, wherein the end wall of the first U-shaped portion and the end wall of the second U-shaped portion are parallel to each other, wherein the first side wall of the first U-shaped portion is parallel to the second side wall of the second U-shaped portion, and wherein the second side wall of the first U-shaped portion is parallel to the first side wall of the second U-shaped portion.

9. The wire theft deterrent system of claim 8, wherein the means for connecting are selected from the group consisting of:
a high-security fastener that includes a screw and a nut, wherein the screw has a pentagonal recess and a pintle that is centered within the pentagonal recess, and wherein the nut has a pentagonal recess;
a pop rivet; and,
a hinge.

10. The wire theft deterrent system of claim 7, wherein the means for connecting are selected from the group consisting of:
a high-security fastener that includes a screw and a nut, wherein the screw has a pentagonal recess and a pintle that is centered within the pentagonal recess, and wherein the nut has a pentagonal recess;
a pop rivet; and,
a hinge.

11. The wire theft deterrent system of claim 10, wherein the connecting means is made of stainless steel.

12. The wire theft deterrent system of claim 7, wherein the first and second U-shaped portions are substantially parallel to a telephone pole.

\* \* \* \* \*